(12) United States Patent
Thomas (10) Patent No.: US 7,744,684 B2
(45) Date of Patent: Jun. 29, 2010

(54) HIGH CAPACITY GAS FILTER SYSTEM WITH INDICATOR

(75) Inventor: Glenn E. Thomas, Louisville, KY (US)

(73) Assignee: Chromatography Research Supplies, Inc., Louisville, KY (US)

(*) Notice: Subject to any disclaimer, the term of this patent is extended or adjusted under 35 U.S.C. 154(b) by 396 days.

(21) Appl. No.: 11/789,679

(22) Filed: Apr. 25, 2007

(65) Prior Publication Data

US 2007/0251391 A1 Nov. 1, 2007

Related U.S. Application Data

(60) Provisional application No. 60/795,142, filed on Apr. 26, 2006.

(51) Int. Cl.
 *B01D 53/02* (2006.01)
(52) U.S. Cl. .......................... 96/417; 96/117; 96/117.5; 96/135; 55/DIG. 34
(58) Field of Classification Search ........... 96/117, 96/117.5, 135, 417; 55/DIG. 34
 See application file for complete search history.

(56) References Cited

U.S. PATENT DOCUMENTS

| | | | | |
|---|---|---|---|---|
| 2,554,879 A | * | 5/1951 | Race, Jr. ............ | 96/117.5 |
| 3,505,783 A | * | 4/1970 | Graham ............ | 95/25 |
| 4,278,453 A | | 7/1981 | Klein | |
| 4,559,066 A | * | 12/1985 | Hunter et al. ...... | 96/117.5 |
| 5,403,387 A | | 4/1995 | Flynn et al. | |
| 5,976,467 A | * | 11/1999 | Dallas et al. ...... | 422/86 |
| 7,285,156 B2 | * | 10/2007 | Arno et al. ........ | 96/117.5 |
| 2005/0087072 A1 | | 4/2005 | Wodjenski et al. | |
| 2005/0201893 A1 | * | 9/2005 | Arno et al. ........ | 422/58 |

FOREIGN PATENT DOCUMENTS

| | | |
|---|---|---|
| DE | 10030831 A | 1/2002 |
| EP | 1479428 A | 11/2004 |

OTHER PUBLICATIONS

International Search Report, Form PCT/ISA/210, 5 pages, for International Application No. PCT/US07/010135 completed on Sep. 11, 2007 and mailed Sep. 19, 2007.

\* cited by examiner

*Primary Examiner*—Robert J Hill, Jr.
*Assistant Examiner*—Christopher P Jones
(74) *Attorney, Agent, or Firm*—James C. Eaves, Jr.; Greenebaum Doll & McDonald PLLC (57) ABSTRACT

The present invention relates to a high capacity gas filter system. The metal filter of the system includes a visible indicator which indicates when the filter is spent. The indicator is preferably a non-reactive glass tube with indicator material therein. The glass tube can be protected to maintain gas flow integrity in case the glass tube breaks. The filter is attachable to or removable from its connecting base using a cooperating threaded knob and threaded bolt such that the filter is pulled tightly onto the base and forced off of the base depending on how the knob is rotated.

16 Claims, 6 Drawing Sheets

HIGH CAPACITY GAS FILTER SYSTEM WITH INDICATOR

This application claims the benefit of U.S. provisional patent application Ser. No. 60/795,142, filed Apr. 26, 2006, for a high capacity gas filter with indicator, incorporated herein by reference.

BACKGROUND OF THE INVENTION (a) Field of the Invention

The present invention relates to a high capacity gas filter system, the filter having a visible indicator showing when the filter is spent.

(b) Description of the Prior Art

In previously known large capacity filters, the filter is generally made of metal and the filter does not include any indicator as part of the filter to know when the filter is spent.

SUMMARY OF THE INVENTION

The present invention relates to a gas filter system which includes a filter and the connecting base to which it is attached.

More particularly, the present invention comprises a high capacity gas filter system having a filter which has a metal filter housing having a cap end and an opposed end. The filter housing has a filter inlet and a filter outlet which are in sequential flow communication via a large adsorbent bed portion, a smaller adsorbent bed portion, and a smaller transparent portion, the smaller transparent portion having an indicator portion which extends externally from and then back into the metal filter housing. The filter inlet and filter outlet are preferably toward the opposed end, the large adsorbent bed portion extends preferably from the filter inlet to the cap end and the smaller adsorbent bed portion preferably extends from a location near the cap end toward the opposed end.

In this high capacity gas filter system, no gas can enter or exit from the filter other than through the filter inlet or filter outlet. The large adsorbent bed preferably contains at least one of an oxygen adsorbent, a molecular sieve, and an activated charcoal, the smaller adsorbent bed portion preferably includes at least one of the activated charcoal and the oxygen adsorbent, and the smaller transparent portion preferably includes at least one of an oxygen indicator and a moisture indicator as well as oxygen adsorbent, the indicators being downstream of the large and smaller adsorbent bed portions. These indicators preferably change color upon contact with appropriate amounts of oxygen or moisture, as appropriate, to indicate when the adsorbents in the filter are no longer able to adsorb oxygen or moisture, so that the filter can be timely replaced when spent.

It is preferable that the transparent portion include an inner sleeve at least partially surrounded by an outer sleeve, the inner sleeve and outer sleeve each being sealed circumferentially at one end against the smaller adsorbent bed portion and at their other end against the metal filter housing. It is also preferable that inner sleeve is a glass inner sleeve and the outer sleeve is a plastic outer sleeve and where additional seals are provided between the transparent portion and the metal filter housing. If there is any gap between the inner sleeve and outer sleeve, it is preferably less than 2 mm.

In the preferred embodiment the metal filter housing comprises a filter body, a relatively large metal portion, and a cap, said relatively large metal portion has internal threaded ends, the filter body has an externally threaded end which is threaded to one end of the relatively large metal portion, the cap has an external threaded portion which is threaded into the other end of the relatively large metal portion, these threaded connections having at least one sealing part therebetween to create gas tight threaded connections. The filter body includes the filter inlet and filter outlet, and the indicator portion extends externally from and then back into the filter body.

Further, the high capacity gas filter system preferably includes a connecting base having an inlet and an outlet and a threaded member extending therefrom, the metal filter housing has a threaded knob retained at least partways therein, the threaded knob having a threaded receptacle therein, the inlet being engageable with the filter inlet, the outlet being engageable with the filter outlet, the threaded member being engageable with the threaded knob's threaded receptacle, where tightening the threaded knob threads the threaded member into the threaded receptacle and engages the inlet and the filter inlet and engages the outlet and the filter outlet to create gas tight connections, and where loosening the threaded knob threads the threaded member out of the threaded receptacle and forces apart the inlet and the filter inlet and forces apart the outlet and the filter outlet.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

A filter cartridge system for filtering non-reactive or inert gases such as helium, argon and nitrogen, as well as more reactive gases such as hydrogen. In FIGS. 1-8, the following drawing legend is used: 1-bracket; 2-connecting base or manifold; 3-gas flow in; 4-inlet; 5-gas flow out; 6-outlet; 7-threaded hex headed bolt; 8-guide pin; 10-filter cartridge; 11-filter body; 12-relatively large metal portion; 13-filter inlet; 14-large adsorbent bed; 16-smaller bed; 17-filter body opening; 18-smaller transparent portion; 19-filter outlet; 20-oxygen indicator; 21-moisture indicator; 22-arrows; 24-glass inner sleeve; 26-plastic outer sleeve; 28-sealing parts-compression O ring; 29-sealing parts-gland O ring; 30-gap; 31-metal tube; 32-threaded return tube fitting; 33-screen; 34-cap; 35-bore; 36-weld at outlet; 37-threaded portion; 38-threaded portion; 40-threaded knob; 41-threaded receptacle; 42-guide pin notch; 43-retaining ring; 44-circumferential groove; 45-oxygen adsorbent; 46-molecular sieve; and 47-activated charcoal.

With reference to FIGS. 1-8, the filter cartridge 10 and its connecting base 2 have the characteristics explained hereinafter. Together, they form the filter system of the present invention.

The cartridge 10 is constructed from a metal filter body 11 having a relatively large metal portion 12 threadably attached thereto at threads 37. A double gas seal is formed by compression o ring 28 and gland o ring 29 between the outside of filter body 11 and inside of metal portion 12 (see FIG. 6). The cartridge 10 contains adsorbents for purification. Downstream, in the gas flow, there is a smaller transparent portion 18 which contains adsorbents which change color in the present of impurities in the gas stream. The large metal portion 12 is positioned at the inlet side of the filter cartridge 10, and the transparent portion 18 is positioned at the exit side of the filter cartridge.

Figure 1:
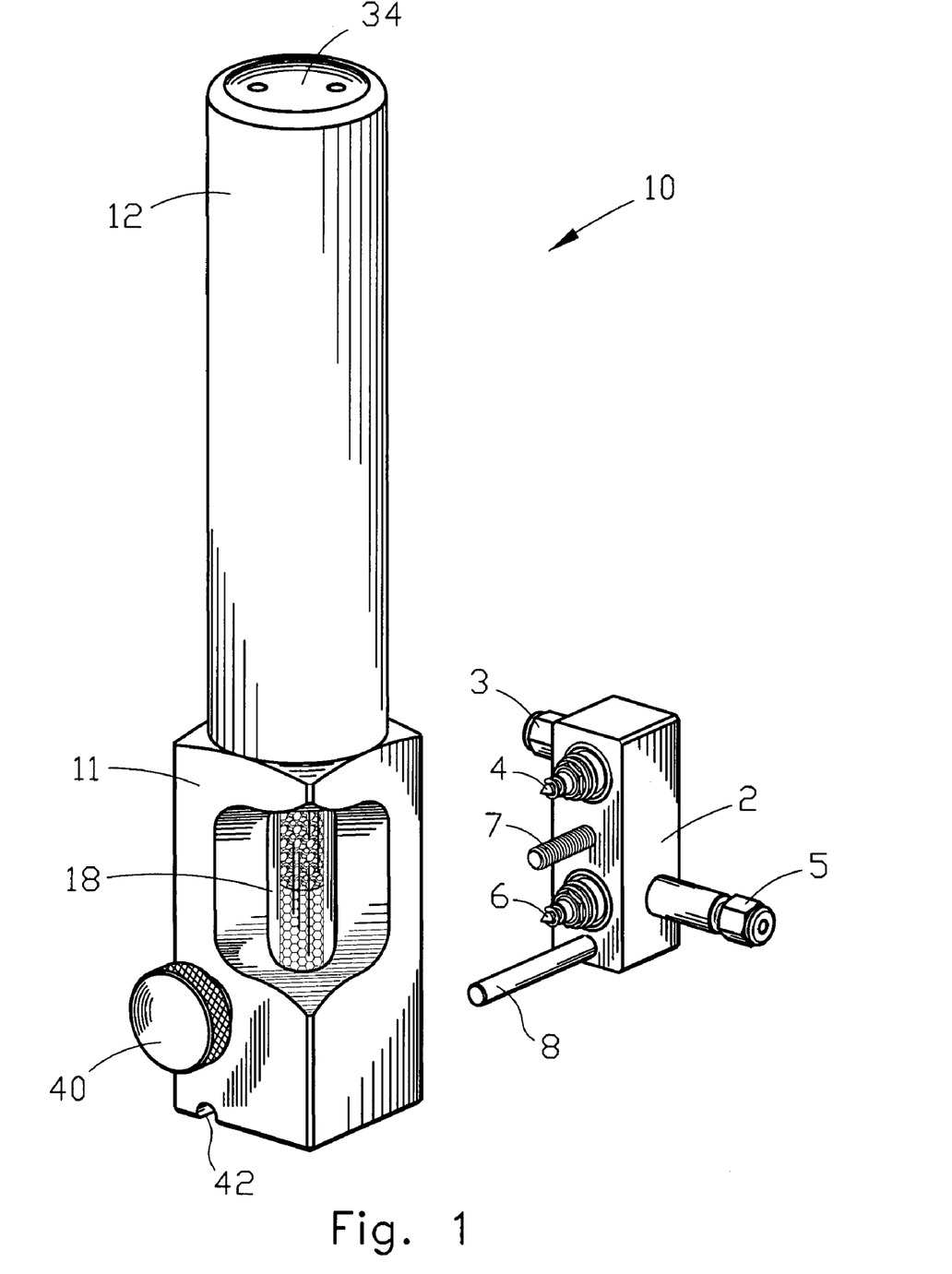
FIG. 1 shows a perspective view of the filter cartridge of the present invention and its connecting base.

In FIG. 1, the cartridge 10 is shown separated from its connecting base 2 which can be connected to the gas lines at gas flow in 3 and gas flow out 5. For gas flow from the connecting base 2 in and out of the filter 10, there is an inlet 4 and an outlet 6. Connecting base also has a threaded hex headed bolt 7 and a guide pin 8, both of which are received by filter 10, hex headed bolt 7 by threaded knob 40 and guide pin 8 by guide pin notch 42.

Figure 2:
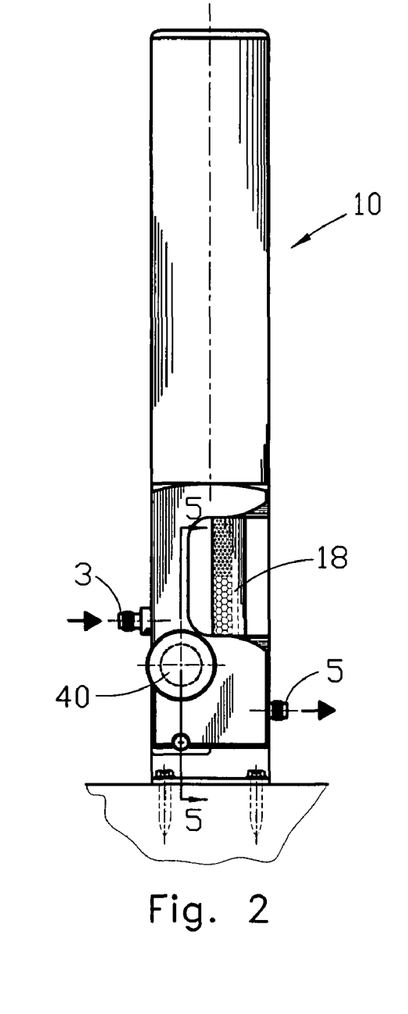
FIG. 2 shows a front perspective view of the filter cartridge of the present invention connected to its connecting base.
Figure 3:
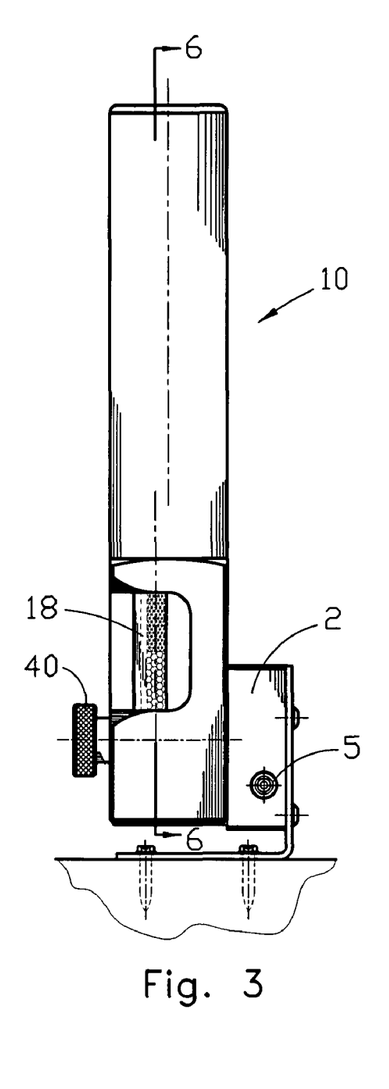
FIG. 3 shows a side perspective view of the filter cartridge of the present invention connected to its connecting base, the view being rotated 90° from the view of FIG. 2.
Figure 4:
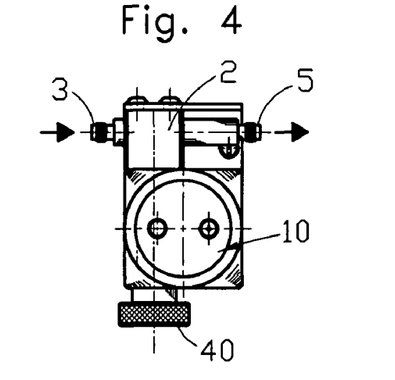
FIG. 4 shows a top perspective view of the filter cartridge of the present invention connected to its connecting base, this top view being a top down view of the cartridge and base of FIG. 2.
Figure 5:
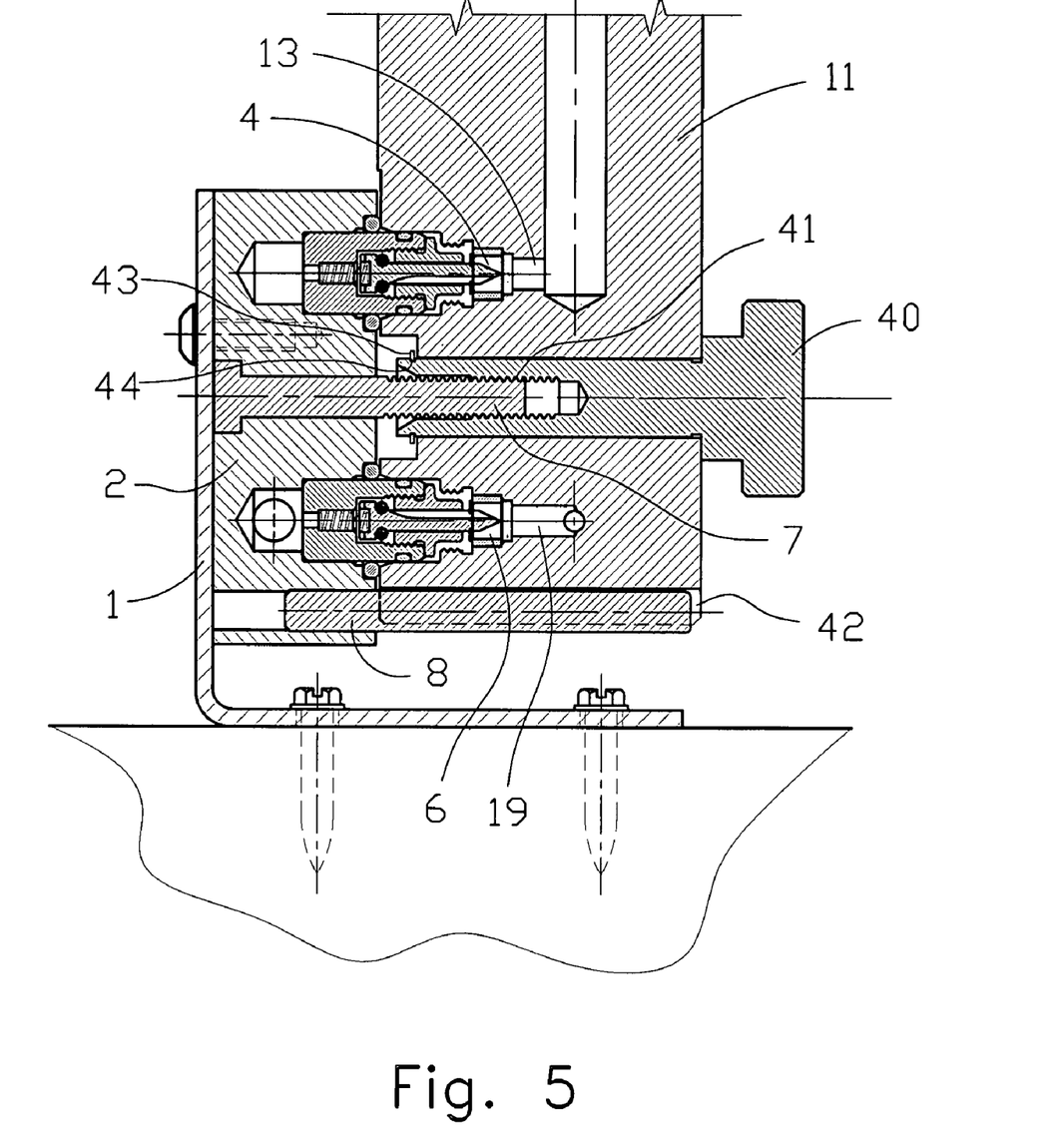
FIG. 5 shows a cross-section portion along the lines 5-5 of FIG. 2 demonstrating the connectivity of the filter cartridge and its connecting base.

With specific reference to FIGS. 2-5, the filter 10 is shown attached to connecting base 2. A bracket 1 is attached to connecting base 2. Having an "L" shape, FIGS. 2, 3, and 5 show that the bracket 1 can be screwed or attached to a surface to retain the connecting base 2 as desired.

With specific reference to FIG. 5, the connectivity of filter 10's filter body 11 to the connecting base 2 is shown. Threaded knob 40 has a threaded receptacle portion 41 which will mate with threaded hex headed bolt 7 of the connecting base 2. Turning the knob 40 one way, typically clockwise, secures the cartridge 10 to the manifold 2 and turning the knob 40 the other way, typically counter-clockwise, forces the cartridge 10 off the manifold or connecting base 2. This has the benefit that the mechanical advantage of the threaded knob can be used to help move the cartridge 10 past sealing parts between the manifold 2 and the cartridge 10 that provide considerable resistance to cartridge 10 removal. Knob 40 has a circumferential groove 44 toward its end with the threaded receptacle 41. A retaining ring 43 is received therein. As is seen in FIG. 5, this ring 43 and groove 44 retain the knob 40 at least partways within filter body 11 so that turning the knob 40 in the proper direction, typically counter-clockwise) actually forces the connecting base 2 and the filter 10 to separate because the ring 43 and groove 44 will not let the knob 40 come further out of the filter body 11.

The inlet 4 and outlet 6 components are typical and, from left to right, include a check valve spool, check valve spring, face seal o ring seal, check valve o ring seal, gland o ring seal, check valve cap, retaining ring, seal cup, check valve needle, and frit. This allows for inlet 4 to connect to filter inlet 13 and filter outlet 19 to connect to outlet 6 so that no gas is able to leak from these filter 10/connecting base 2 connections.

Figure 6:
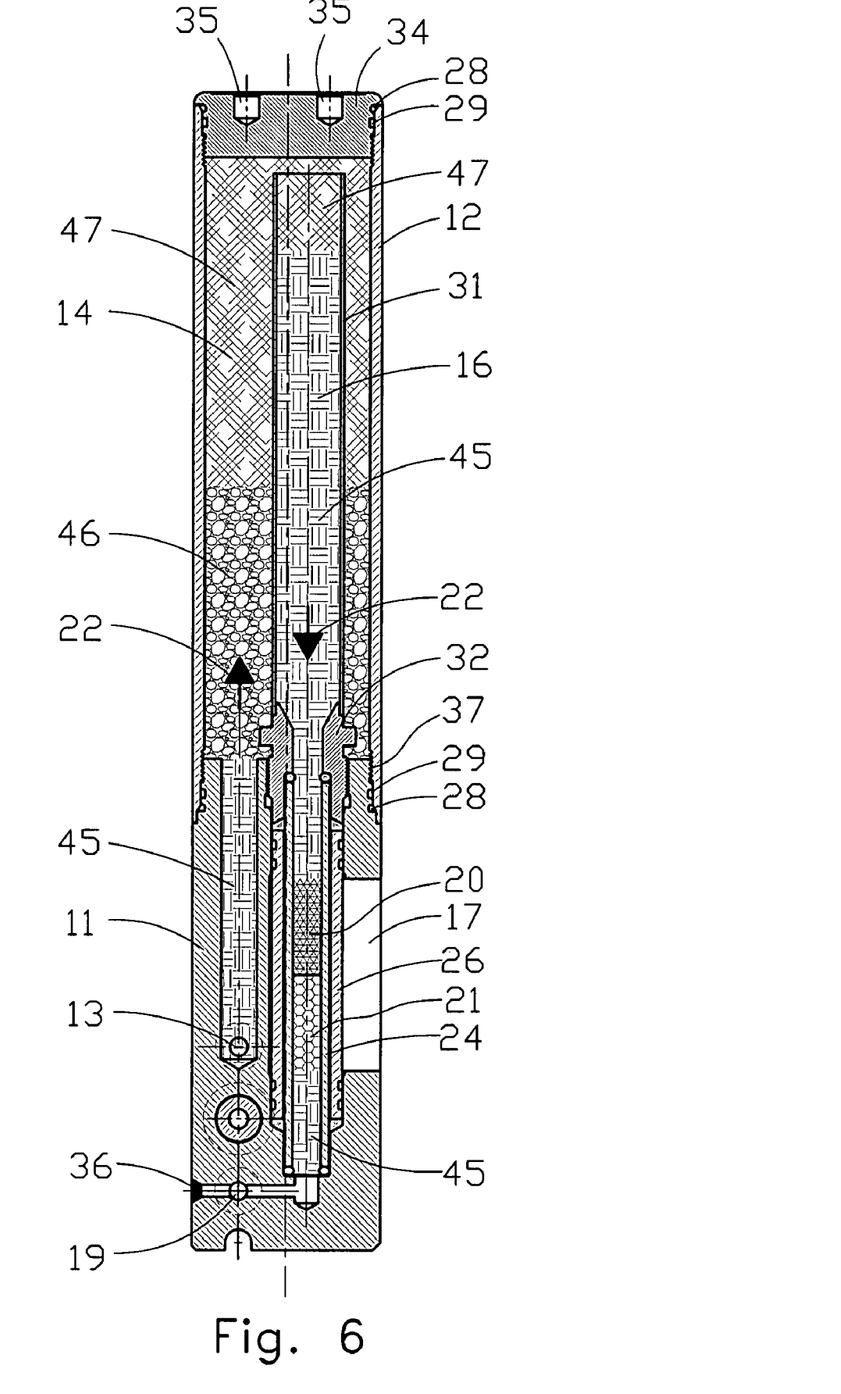
FIG. 6 shows a cross-section of the filter cartridge along the lines 6-6 of FIG. 3 showing the gas flow in the filter cartridge through adsorbents.
Figure 7:
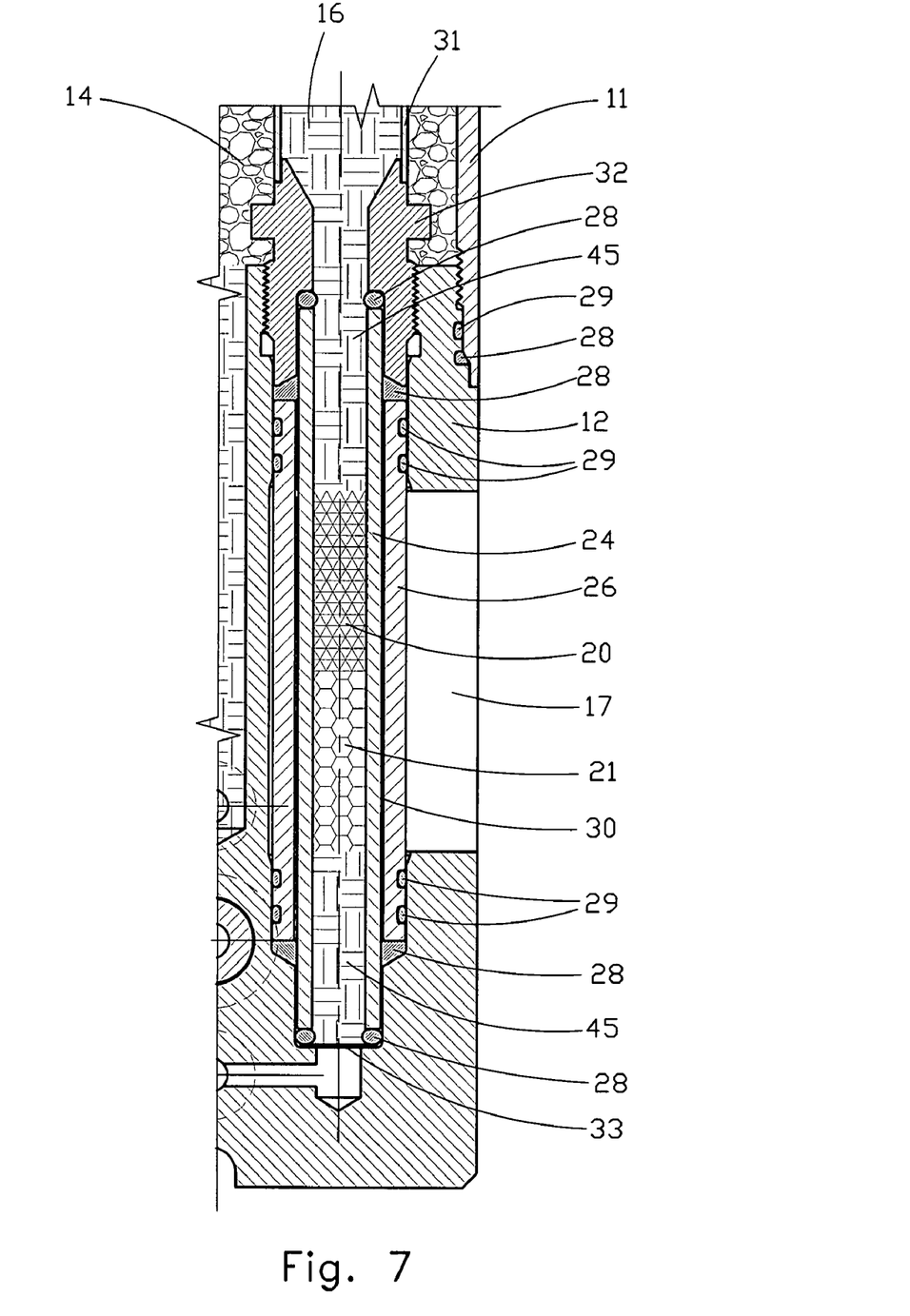
FIG. 7 shows an expanded cross-section view of the lower right portion of the filter cartridge of FIG. 6; and, FIG. 8 shows a cross-section view of the top portion of the filter cartridge and its cap.

FIG. 6 shows the gas flow direction and FIGS. 6 and 7 show the preferred adsorbent configuration, and the filter component connectivity. The gas path in the metal portions 11 and 12 is so arranged that the gas flows in through filter inlet 13 (which mates with base inlet 4) and then through a large adsorbent bed 14 of relatively large cross-section and then through a smaller bed 16 of relatively small cross section prior to passing through the transparent portion 18 to exit the filter 10 through filter outlet 19 (which mates with base outlet 6).

The large adsorbent bed 14 can contain activated charcoal 47 portions to remove hydrocarbons and a molecular sieve 46 to remove water. Further bed 14 can optionally include a high-capacity Cu, Ni, or Mn based oxygen adsorbent 45. The bed of smaller cross section 16 allows the optimal use of a special adsorbent, of which the performance must be maximized for adsorbtion capacity and efficiency. For example, it could contain a Cu, Ni, or Mn based oxygen adsorbent. The arrows 22 show the direction of gas flow.

As shown in this preferred embodiment, bed 14 contains oxygen adsorbent 45 between the filter inlet 13 and the location where molecular sieve 46 starts. The molecular sieve is at about the filter middle portion. Above the molecular sieve 46 in bed 14 is activated charcoal 47, which preferably extends slightly into smaller bed 16.

Smaller bed 16 is formed by metal tube 31 which then connects to a threaded return tube fitting 32. Threaded return tube fitting 32 will interface the transparent inner sleeve 24 and transparent outer sleeve 26, as is explained hereinafter. Below the activated charcoal 47 in smaller bed 16 is oxygen adsorbent 45, which preferably extends the rest of the way through metal tube 31, through return tube fitting 32, and into the top portion of inner sleeve 24, which is the start of the transparent portion 18. Inner sleeve 24 will also preferably contain oxygen adsorbent 45 in the area below the indicator portions. At the bottom of inner sleeve 24, there is a screen 33 of preferably about 100 mesh which confines the adsorbent material but allows gas flow. Instead of screen 33, a porous metal frit or glass wool could be employed to confine the adsorbent material.

Filter body 11 is made such that there is an opening 17 which permits the transparent portion 18 to be visible. In the visible portion, the transparent portion 18 contains color changing indicator adsorbent material, preferably an oxygen indicator 20 and a moisture indicator 21. These indicators allow one to see when filter 10 is no longer able to remove oxygen and water from the gas stream and needs replacement.

FIG. 6 shows how filter outlet 19 is formed. A bore is drilled from the outside of the filter body 11 to connect below the location of screen 33 so that there will be gas connectivity. The bore opening at the outside of filter body 11 is then closed by weld 36.

With continued reference to FIG. 6 and specifically FIG. 7, the transparent portion 18 of the cartridge may consist of two sleeves 24, 26, the inner sleeve 24 of glass and the outer sleeve 26 of a plastic material, for example. Where the inner sleeve 24 is of glass, compression o rings 28 at each end or sleeve 24 protect the ends of sleeve 24 from chipping during assembly. Multiple sealing parts can be inserted between the inner sleeve 24 and the metal filter housing and between the outer sleeve 26 and the metal filter housing, so that if the inner sleeve 24 is broken or if any one of the sealing parts fails, the gas being purified still can not leak from the filter 10. Multiple seals may also be placed between the manifold and cartridge units and all joints in the filter cartridge. The presence of at least double seals at all joints amounts to a double-fault protection system and renders the filter system more suitable for handling hydrogen and other reactive gases.

As shown in FIG. 7, compression o rings are at the top and bottom of glass inner sleeve 24 and also at the top and bottom of plastic outer sleeve 26. A pair of gland o rings 29 are also toward the top and bottom of plastic outer sleeve 26.

If the transparent portion 18 of the cartridge 10 consists of two sleeves 24, 26 as shown, the gap 30 between the inner 24 and outer sleeve 26 is preferably less than 2 mm in order to prevent the accumulation of reactive gas between the inner 24 and outer sleeve 26 in the event that the inner sleeve 24 is broken or if a sealing part 28, 29 fails.

If the transparent portion 18 of the cartridge 10 consists of two sleeves 24, 26, the compression of one or more of the sealing parts 28, 29 can be effected by a force directed through the outer sleeve 26 in the axial direction. This can allow the assembly of the transparent portion 18 of the filter cartridge 10 from a single end. As is seen in FIG. 7, it is the threading of threaded return tube fitting 32 into filter body 11 that exerts this force. This threading allows the transparent portion 18 of the filter 10 to be assembled from the top side of the cartridge 10, and additionally connects the optimized portion of the filter bed directly to the indicating 18 and exit portion of the filter.

Figure 8:
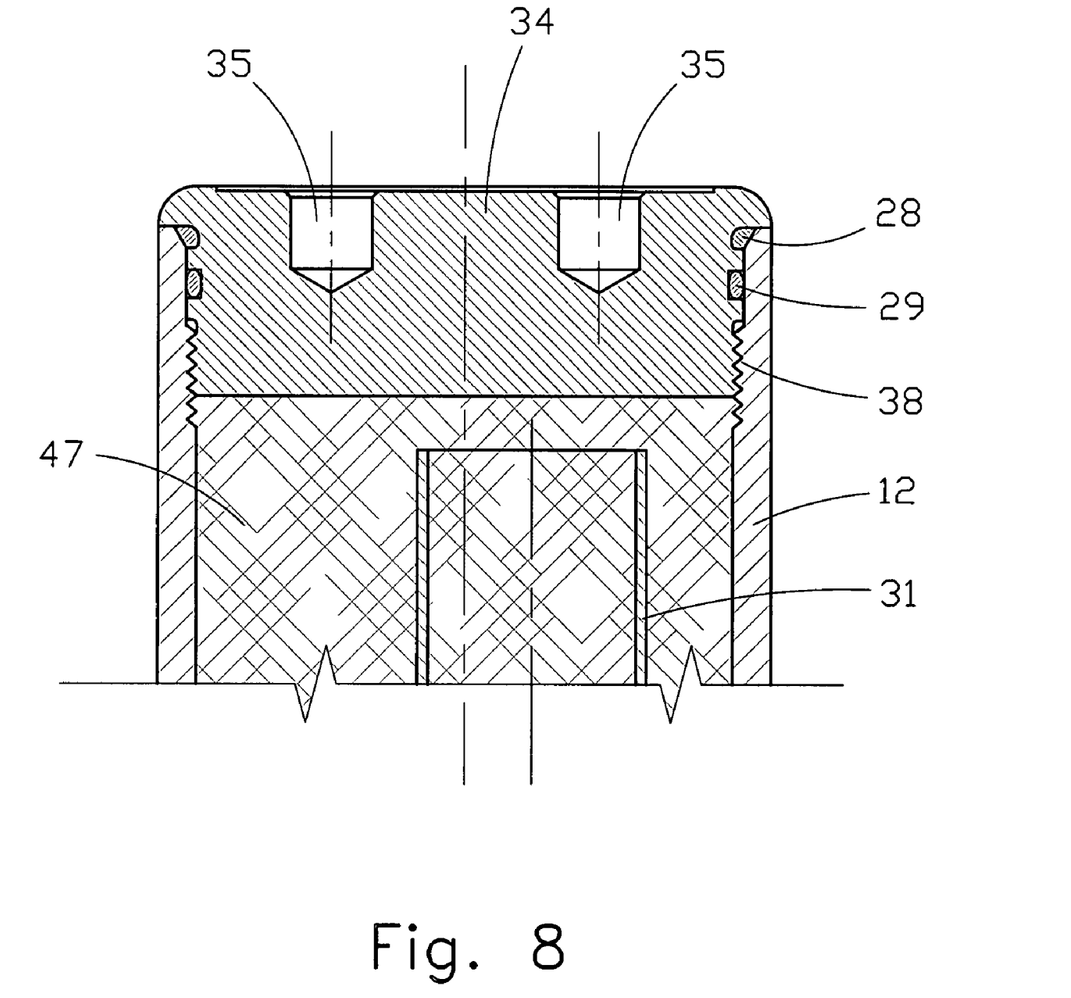

FIG. 8 shows how the cap 34, also seen in FIGS. 1 and 6, is threadably received by the threaded top end of metal portion 12. These threads are shown at 38. The top of cap 34 contains a pair of bores 35 therein for insertion and removal of cap 34. A double gas seal is formed by compression o ring 28 and gland o ring 29 between the cap 34 and inside of metal portion 12.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A high capacity gas filter system, comprising: a filter, said filter further comprising: a metal filter housing having a cap end and an opposed end, said filter housing having a filter inlet and a filter outlet, said filter inlet and said filter outlet being in sequential flow communication via a large adsorbent bed portion, a smaller adsorbent bed portion, and a smaller transparent portion, said smaller transparent portion having an indicator portion which extends externally from and then back into said metal filter housing; said smaller adsorbent bed portion comprising a tube which is open at its end toward said cap end of said metal filter housing and not attached to anything at that end; where said transparent portion includes an inner sleeve at least partially surrounded by an outer sleeve, said inner sleeve and said outer sleeve each being sealed circumferentially at one end against said smaller adsorbent bed portion and at their other end against said metal filter housing.

2. The high capacity gas filter system of claim 1, where said filter inlet and said filter outlet are toward said opposed end, said large adsorbent bed portion extending from said filter inlet to said cap end, said smaller adsorbent bed portion extending from a location near said cap end toward said opposed end.

3. The high capacity gas filter system of claim 1, where no gas can enter or exit from said filter other than through said filter inlet or said filter outlet.

4. The high capacity gas filter system of claim 1, where said large adsorbent bed contains at least one of an oxygen adsorbent, a molecular sieve, and an activated charcoal, where said smaller adsorbent bed portion includes at least one of said activated charcoal and said oxygen adsorbent, and where said smaller transparent portion includes at least one of an oxygen indicator and a moisture indicator as well as said oxygen adsorbent.

5. The high capacity gas filter system of claim 1, where said inner sleeve is a glass inner sleeve and where said outer sleeve is a plastic outer sleeve and where additional seals are provided between said transparent portion and metal filter housing.

6. The high capacity gas filter system of claim 5, where any gap between said inner sleeve and said outer sleeve is less than 2 mm.

7. The high capacity gas filter system of claim 1, where said metal filter housing comprises a filter body, a relatively large metal portion, and a cap, said relatively large metal portion having internal threaded ends, said filter body having an externally threaded end which is threaded to one end of said relatively large metal portion, said cap having an external threaded portion which is threaded into the other end of said relatively large metal portion, said threaded connections between said cap and said relatively large metal portion and between said relatively large metal portion and said filter body each having at least one sealing part therebetween to create gas tight threaded connections, where said filter body includes said filter inlet and said filter outlet, and where said indicator portion extends externally from and then back into said filter body.

8. The high capacity gas filter system of claim 7, where said filter inlet and said filter outlet are toward said opposed end, said large adsorbent bed portion extending from said filter inlet to said cap end, said smaller adsorbent bed portion extending from a location near said cap end toward said opposed end.

9. The high capacity gas filter system of claim 8, where said tube of said smaller adsorbent bed is a metal tube connected at one end to a threaded return tube fitting, and said circumferential seals being created by the threading of said threaded return tube fitting into said filter body.

10. The high capacity gas filter system of claim 9, where said inner sleeve is a glass inner sleeve and where said outer sleeve is a plastic outer sleeve and where additional seals are provided between said transparent portion and metal filter housing.

11. The high capacity gas filter system of claim 10, where any gap between said inner sleeve and said outer sleeve is less than 2 mm.

12. The high capacity gas filter system of claim 9, further comprising a connecting base, said connecting base having an inlet and an outlet and a threaded member extending therefrom, said filter body having a threaded knob retained at least partways therein, said threaded knob having a threaded receptacle therein, said inlet being engageable with said filter inlet, said outlet being engageable with said filter outlet, said threaded member being engageable with said threaded knob's threaded receptacle, where tightening said threaded knob threads said threaded member into said threaded receptacle and engages said inlet and said filter inlet and engages said outlet and said filter outlet to create gas tight connections, and where loosening said threaded knob threads said threaded member out of said threaded receptacle and forces apart said inlet and said filter inlet and forces apart said outlet and said filter outlet.

13. The high capacity gas filter system of claim 12, where said inner sleeve is a glass inner sleeve and where said outer sleeve is a plastic outer sleeve and where additional seals are provided between said transparent portion and metal filter housing.

14. The high capacity gas filter system of claim 12, where no gas can enter or exit from said filter other than through said filter inlet or said filter outlet.

15. The high capacity gas filter system of claim 12, where said large adsorbent bed contains at least one of an oxygen adsorbent, a molecular sieve, and an activated charcoal, where said smaller adsorbent bed portion includes at least one of said activated charcoal and said oxygen adsorbent, and where said smaller transparent portion includes at least one of an oxygen indicator and a moisture indicator as well as said oxygen adsorbent.

16. The high capacity gas filter system of claim 1, further comprising a connecting base, said connecting base having an inlet and an outlet, said connecting base having a threaded member extending therefrom, said metal filter housing having a threaded knob retained at least partways therein, said threaded knob having a threaded receptacle therein, said inlet being engageable with said filter inlet, said outlet being engageable with said filter outlet, said threaded member being engageable with said threaded knob's threaded receptacle, where tightening said threaded knob threads said threaded member into said threaded receptacle and engages said inlet and said filter inlet and engages said outlet and said filter outlet to create gas tight connections, and where loosening said threaded knob threads said threaded member out of said threaded receptacle and forces apart said inlet and said filter inlet and forces apart said outlet and said filter outlet.

* * * * *